Jan. 27, 1925.
A. E. LANG
1,524,563
RUNNER FOR SLEDS AND SLEIGHS
Filed March 31, 1923    2 Sheets-Sheet 1
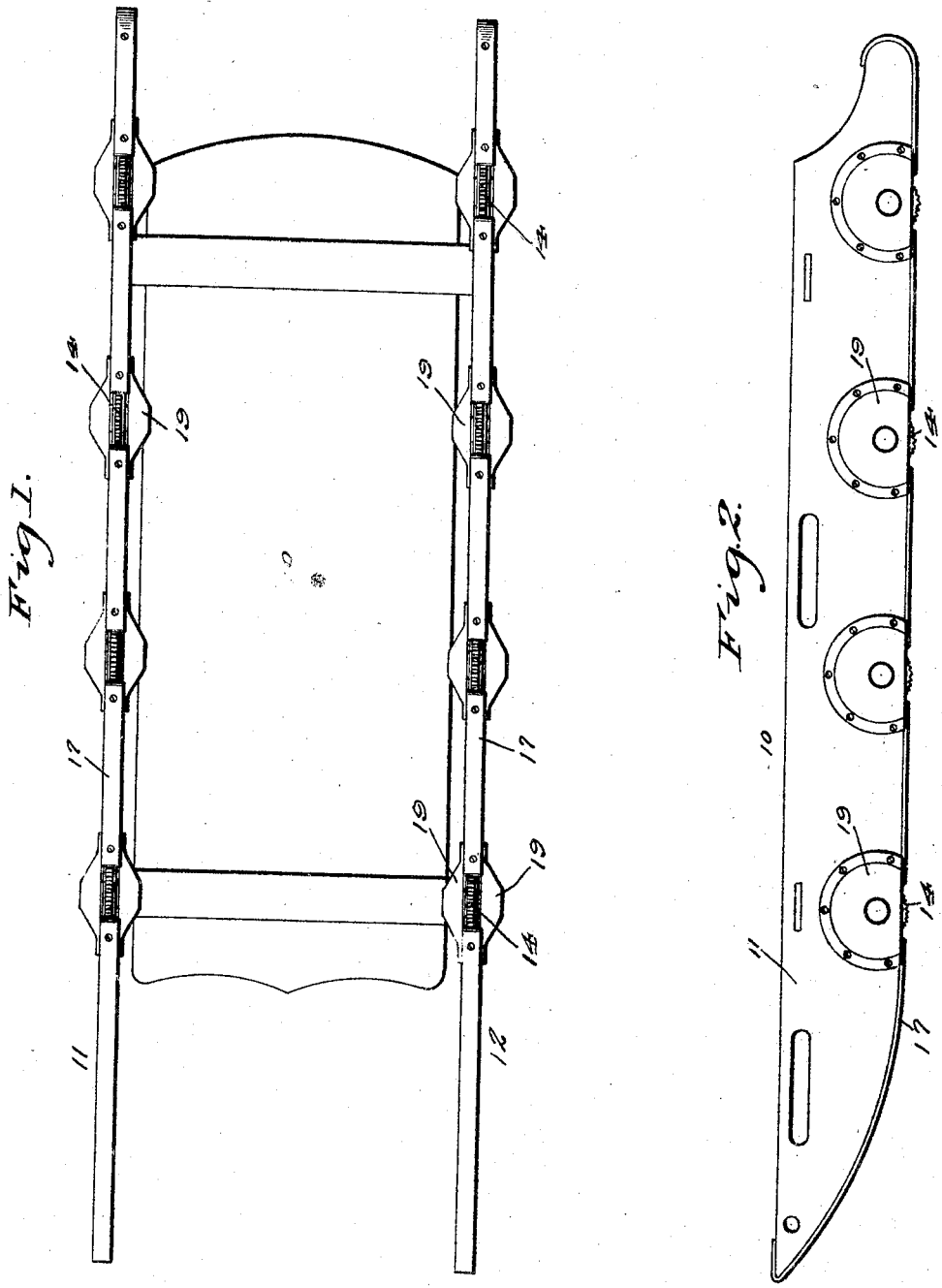

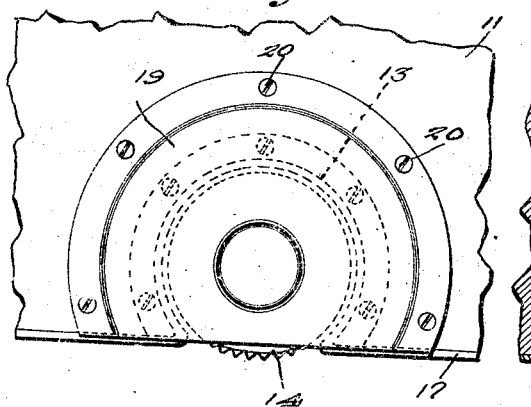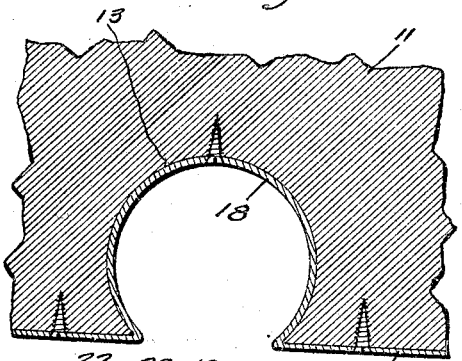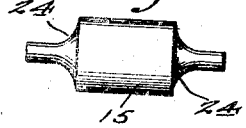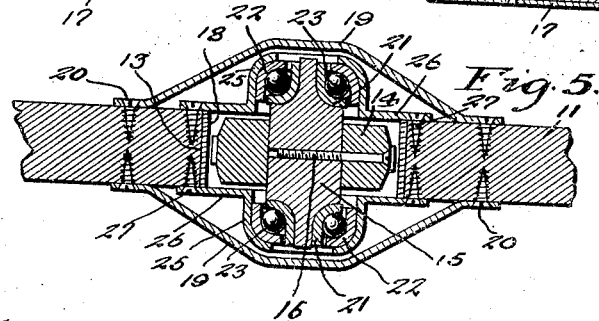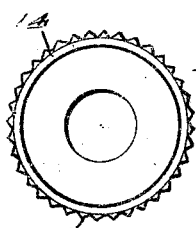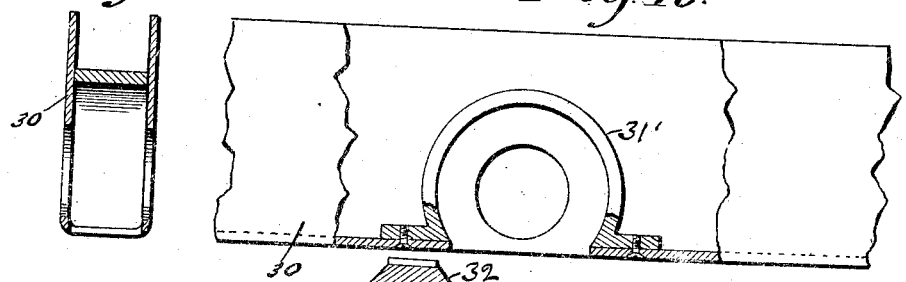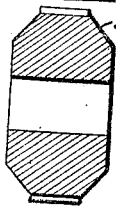

Patented Jan. 27, 1925.

1,524,563

UNITED STATES PATENT OFFICE.

ANTHONY E. LANG, OF HUNTINGDON, PENNSYLVANIA.

RUNNER FOR SLEDS AND SLEIGHS.

Application filed March 31, 1923. Serial No. 629,036.

*To all whom it may concern:*

Be it known that I, ANTHONY E. LANG, a citizen of the United States, residing at Huntingdon, in the county of Huntingdon and State of Pennsylvania, have invented new and useful Improvements in Runners for Sleds and Sleighs, of which the following is a specification.

The object of this invention is to provide a runner for a sled or sleigh with rollers mounted in ball bearings, in order that the vehicle may be able to travel, not only in snow and ice, but also over bare ground or the like, when encountered in the open road, at crossings, or elsewhere.

A further object is to provide a wooden runner with openings for mounting the necessary rollers, and with reinforcing elements extending around the edge of the runner and into the openings specified.

A still further object is to provide a particular form of protecting device or devices for the rollers and the bearings, for use either in connection with a wooden runner or with an all steel runner, and serving to prevent obstruction by the accumulation of the snow or ice.

With the foregoing and other objects in view, the invention consists in the novel construction and arrangement of elements described, illustrated and claimed, it being understood that modifications may be made within the scope of the claims without departing from the spirit of the invention.

In the drawings, Figure 1 is a bottom plan view of a sled, showing rollers mounted in the runners; Figure 2 is a view in side elevation; Figure 3 is a fragmentary side elevation, showing in dotted lines the element for housing the ball bearings; Figure 4 is a fragmentary view in vertical section, showing the wall of a recess for one of the rollers reinforced; Figure 5 is a horizontal section through the roller, axle and mounting means; Figure 6 shows the axle detached; Figure 7 is a side view of a roller, detached; Figures 8 and 9 illustrate as a modification a channel shaped metallic runner; Figure 10 shows a separate segmental roller housing within the channel and secured to the web thereof; Figure 11 is a section of a modified roller having a tread with bevelled shoulder portions 32.

The body of the sled is designated 10, and the runners are shown at 11 and 12. Each runner is provided with transverse openings 13 partly circular in form and proportioned to receive rollers 14 of such size that they will project slightly below the finished runners. Four rollers may be provided for each runner, the number being as desired, and the rollers may be of wood, metal or other suitable substance.

Each roller is mounted on a pin or axle 15, and is secured by a screw 16, the head of which is countersunk, all screws employed being similarly provided for.

The ends of the axles 15 are reduced as shown, and ball bearings are provided for each end. In order to avoid weakening the wooden runner by providing the transverse openings therein above referred to, I reinforce the runner by a protecting strip 17, the flat portion of which constitutes a steel shoe, and the curved portion 18 of which provides a part of the housing for each roller. The housing is completed by the use of annular cover members 19 on each side of the runner, the elements 19 being secured by screws 20.

The inner and outer raceways are designated 21 and 22, and the balls of the bearings are shown at 23. The inner raceway conforms to the curvature of the shoulder 24 on the axle, and a casing member 25 has one portion curved inwardly toward the axle as shown, conforming with the curvature of the outer raceway. The element 25 may be formed with flat annular members 26 completing the casing for the roller bearing, which casing is secured by screws 27.

A similar form of housing, casing, or protecting device may be employed with an all steel runner made in channel form as shown in Figure 9. This runner is designated 30 and is cutaway transversely to provide for the housing elements of the roller and the ball bearing. A guard 31' prevents snow from reaching the roller bearings. Figure 11 shows a roller having a tread with bevelled shoulders 32, and the tread as a whole facilitates cutting of the snow without providing a track of the width of the runners, because the latter should slide freely when there is sufficient snow or ice for the purpose.

In each case the rollers are roughened in any suitable manner, the roughened surfaces being designated 31, it being desired that the rollers shall turn under all conditions, and not become obstructed with snow or ice.

As previously intimated, I do not wish to limit myself to particular materials or to details of construction, but may make such changes as fall within the scope of the appended claims.

What is claimed is:—

1. A runner provided with transverse openings, a roller positioned in each opening, and projecting below the lower edge of the runner, bearings and housings for the bearings, said housings being mounted on the opposite sides of the runner, opposite each opening, an axle passing through the roller and into said bearings, a strip secured to the edge of the runner, and devices reinforcing the walls of the openings and connected with said strip.

2. A runner provided with transverse openings, a roller positioned in each opening and rotatable about an axis perpendicular to the sides of the runner, an axle for the rollers, bearings for the axle, said bearings including a plurality of raceways and anti-friction devices, housing members for the bearings, said members being secured to opposite sides of the runner, and protecting elements enclosing said housing for the bearings, and enclosing the roller.

3. A runner provided with transverse openings, a roller positioned in each opening, and projecting below the lower edge of the runner, bearings and housings therefor, mounted on the opposite sides of the runner, opposite each opening, an axle passing through the roller and into said bearings, protecting devices enclosing said bearings and rollers, and a shoe for the runner, said shoe being deflected around the walls of said openings.

In testimony whereof I affix my signature.

ANTHONY E. LANG.